US008740063B2

(12) United States Patent
Ring et al.

(10) Patent No.: US 8,740,063 B2
(45) Date of Patent: Jun. 3, 2014

(54) CASH DISPENSING APPARATUS

(75) Inventors: Gerard Ring, Buckinghamshire (GB); Matthew Stares, Buckinghamshire (GB)

(73) Assignee: The Royal Bank of Scotland (GB)

( * ) Notice: Subject to any disclaimer, the term of this patent is extended or adjusted under 35 U.S.C. 154(b) by 581 days.

(21) Appl. No.: 12/999,243

(22) PCT Filed: Jun. 18, 2009

(86) PCT No.: PCT/EP2009/057640
§ 371 (c)(1),
(2), (4) Date: Apr. 19, 2011

(87) PCT Pub. No.: WO2009/153330
PCT Pub. Date: Dec. 23, 2009

(65) Prior Publication Data

US 2011/0190929 A1 Aug. 4, 2011

(30) Foreign Application Priority Data

Jun. 18, 2008 (GB) .................................. 0811169.2

(51) Int. Cl.
*G06Q 40/00* (2012.01)

(52) U.S. Cl.
USPC .......................................................... 235/379

(58) Field of Classification Search
USPC .......................................................... 235/379
See application file for complete search history.

(56) References Cited

U.S. PATENT DOCUMENTS

| | | | | |
|---|---|---|---|---|
| 4,524,268 A * | 6/1985 | Fukatsu | ........................ | 235/379 |
| 5,173,590 A | 12/1992 | Nakano et al. | | |
| 5,561,281 A * | 10/1996 | Eda et al. | ........................ | 235/379 |
| 6,607,124 B1 * | 8/2003 | Junkins et al. | ................ | 235/379 |
| 7,559,459 B2 * | 7/2009 | Schmidt et al. | ............... | 235/379 |

FOREIGN PATENT DOCUMENTS

| | | | |
|---|---|---|---|
| EP | 1376486 | A2 | 1/2004 |
| GB | 2363426 | A | 12/2001 |
| GB | 2449748 | A | 12/2008 |

* cited by examiner

*Primary Examiner* — Michael G Lee
*Assistant Examiner* — David Tardif
(74) *Attorney, Agent, or Firm* — DLA Piper LLP (US)

(57) ABSTRACT

Disclosed is a cash dispensing apparatus (10) comprising at least two cash compartments (20, 22) and a cash delivery mechanism operable to deliver cash notes from either compartment to a recipient, each compartment (20, 22) being independently lockable and arranged to prevent access therefrom to cash in the other compartment(s).

15 Claims, 2 Drawing Sheets

CASH DISPENSING APPARATUS

FIELD OF THE INVENTION

The present invention relates to an apparatus and system relating to the storage and dispensing of cash from a cash dispensing apparatus.

BACKGROUND OF THE INVENTION

Automated Teller Machines (ATMs) are an important convenience that many merchants, such as a shop keeper, offer to their customers. They provide customers with easy access to the customer's funds so that they can make purchases while at the merchant's place of business. In addition to providing a convenience to customers, they are beneficial to merchants: customers can access their cash without leaving the merchant's premises; ATMs may also result in increased sales as customers may choose to make additional purchases while at the merchant's location.

ATMs located in a merchant's premises can also provide revenue for the merchant and perhaps other companies involved in the transaction, as many ATMs located on such premises have a fee associated with drawing money. However, there are occasions when the merchant may not replenish the ATM when the stored cash is depleted, and the provider of the ATM loses potential revenue due to this.

Many ATMs are serviced solely by the provider or their authorised agents i.e. not by the merchant. Therefore, the merchant has to wait for the provider to refill the ATM when the cash is depleted. Moreover, the cost of replenishing such units can be costly to the merchant and/or ATM provider. In addition, if money becomes jammed in the ATM this may result in the ATM becoming inoperable and no transactions can be made until a service engineer is called out to clear the jam.

To try and reduce the replenishment cost associated with ATMs serviced solely by the provider, one known device allows an employee, at the merchant's into an acceptor on the dispenser of the ATM. This solution reduces the number of visits required, by the provider, to replenish the ATM and eliminates the need for the merchant to have to gain entry to the cash drawer, which the provider is reluctant to allow due to the risk of loss or theft of money from the cash drawer.

SUMMARY OF THE INVENTION

In accordance with one aspect of the present invention, there is provided a cash dispensing apparatus comprising at least two cash compartments and a cash delivery mechanism operable to deliver cash notes from either compartment to a recipient, each compartment being independently lockable and arranged to prevent access therefrom to cash in the other compartment(s).

Preferably, the apparatus is arranged to track progress of cash notes being delivered through the cash delivery mechanism from any one of the at least two cash compartments.

Preferably, the cash delivery mechanism is accessible independently from accessing either of said at least two cash compartments.

Further, the cash delivery mechanism may be accessible through at least one of said at least two cash compartments.

Conveniently, a part of the cash delivery mechanism is arranged to feed cash notes from a first of said at least two cash compartments, and said part of the cash delivery system is accessible through a second of said at least two cash compartments.

The cash delivery mechanism may comprise a common path for feeding cash notes taken from either of the at least two cash compartments.

Preferably, at least one of the two cash compartments has a cash note qualifier and rejection system.

The device may include a system for monitoring activity of said at least two cash compartments.

Preferably, the system is arranged to record data indicative of a use of either of said at least two cash compartments.

The device may comprise at least one sensor for tracking cash notes delivered from either of said at least two cash compartments, wherein the system is arranged to record data indicative of a quantity of cash notes delivered from either of said at least two storage compartments to a recipient.

The system may be arranged to record data indicative of a quantity of cash notes transferred into and/or out of either of said at least two cash compartments.

The cash delivery mechanism may be arranged to deliver cash notes from a first of said cash compartments in preference to delivering cash notes from a second of the cash compartments.

Alternatively, the cash delivery mechanism delivers cash notes from said second cash compartment when there is insufficient cash in the first cash compartment.

In accordance with another aspect of the present invention there is provided a system for delivering cash to a recipient, the system comprising the cash dispensing apparatus of the invention, an account system and a network connecting the cash dispensing apparatus to the account system, wherein the cash dispensing apparatus is operable to send and/or receive data relating to said at least two cash compartments to and/or from the accounting system.

Preferably, the data relates to an authorisation request to the account system in response to a cash withdrawal operation initiated by the recipient, the request including an indication of the compartment intended by the cash dispensing apparatus for satisfying the cash withdrawal.

Preferably, the accounting system is arranged to process data indicative of crediting a keeper of the cash dispensing apparatus with the amount of said cash withdrawal when the withdrawn cash has been delivered from a selected one of said cash compartments.

In accordance with yet a further embodiment of the present invention, there is provided a method of communicating data relating to the cash dispensing apparatus of the invention, the method including sending and/or receiving data relating to an activity of either of the at least two cash compartments.

Preferably, the data is indicative of a quantity of cash notes delivered from either of said at least two storage compartments to a recipient.

Preferably, the data is indicative of a quantity of cash notes transferred into and/or out of said at least two cash compartments.

Further features and advantages of the invention will become apparent from the following description of preferred embodiments of the invention, given by way of example only, which is made with reference to the accompanying drawings.

DETAILED DESCRIPTION OF THE INVENTION

Figure 1:
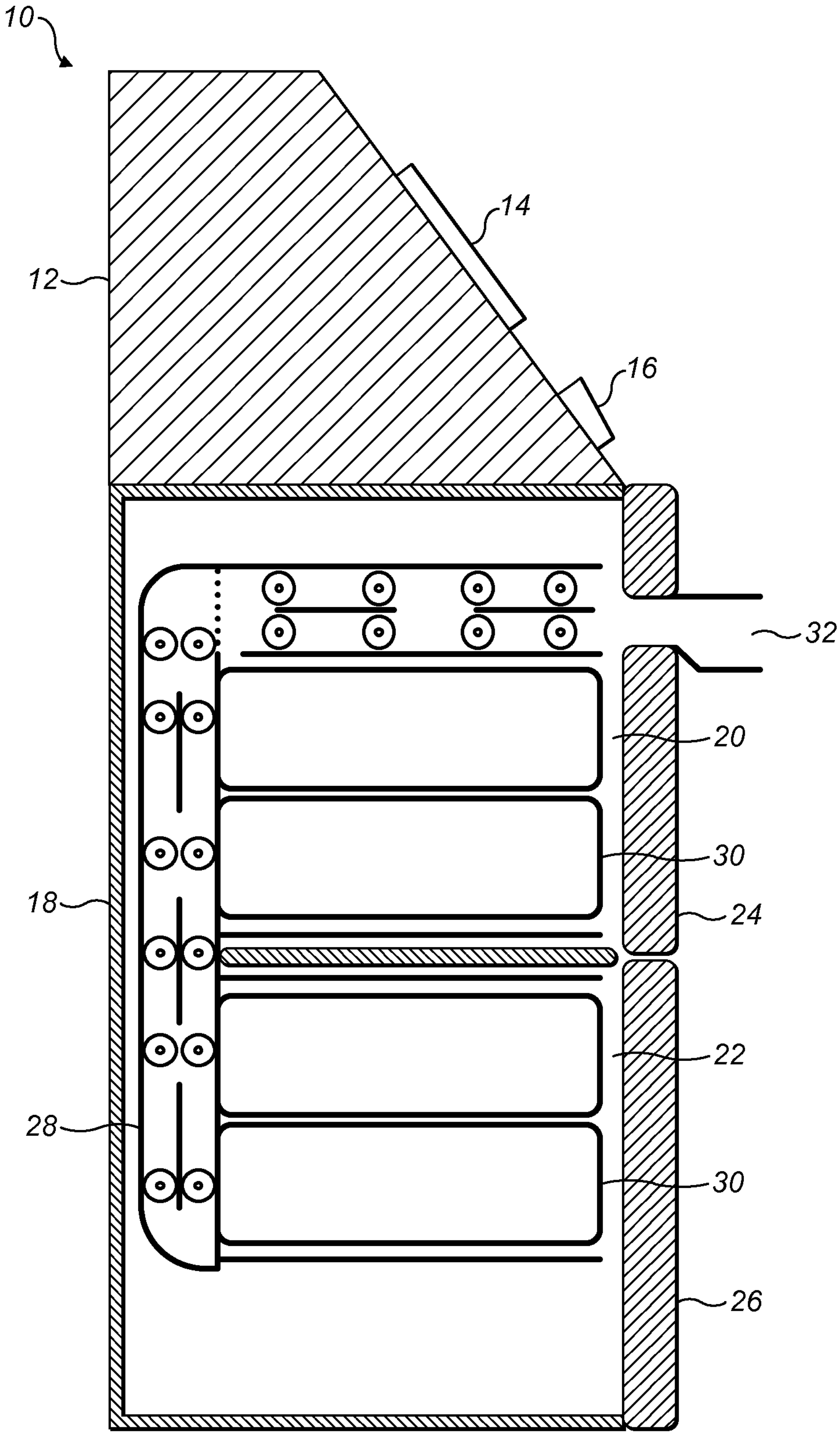
FIG. 1 shows a schematic cross sectional view of a cash dispensing machine according to an embodiment of the present invention.

The diagram in FIG. 1 shows a cross sectional side view of a cash dispensing apparatus, which is an ATM 10, according to an embodiment of the present invention. The ATM 10 is similar in parts to known ATMs and includes a head unit 12, where the screen 14, keypad 16, printer, card reader and central processing unit (CPU) are located, and a secure body 18 in which money is stored and dispensed from. The secure body 18 has a first cash compartment 20 and a second cash compartment 22. The first cash compartment 20 and the second cash compartment 22 are provided with respective doors 24, 26 so that each compartment is independently accessible. The secure body 18 is also provided with a cash delivery mechanism 28, which is located, in this example, at the rear of the body 18 on the opposite side of the compartments 20, 22 from the doors 24, 26. The cash delivery mechanism 28 is designed so that it can access money, in particular cash notes, from any one of the compartments 20, 22 and transport it to a dispenser 32, such as a bill tray, where a customer can retrieve cash. Each cash compartment is a safe in this embodiment.

This arrangement, of having an ATM with two independent safes, provides the advantage of being able to have the ATM filled with cash from two independent sources. Therefore, the ATM herein disclosed can be replenished with cash by the merchant in one safe 20, and replenished with cash by the service provider, for example the bank, in another safe 22. Each cash compartment cannot be accessed via the other cash compartment for security purposes.

Another advantage of this arrangement is that there is no need for the merchant to access the service provider's cash drawer, thereby alleviating the possibility of loss or theft of money from the service provider's cash drawer, as the merchant has their own designated cash compartment, and is unable to access the service provider's cash compartment.

The doors 24, 26 which provide access to the cash compartments are provided with locking mechanisms which are independently lockable with respect to each other, to prevent unauthorised entry to one of the cash compartments by a person authorised to access the other compartment. In addition, sensors are placed in the ATM that will monitor and log each time each of the doors is opened and locked. This log can then be retrieved by the service provider when needed.

The first and second cash compartments are provided with cassettes 30 in which cash is stored. Each cassette 30 has a mechanism that allows money to be fed from the cassette 30 to the cash delivery mechanism 28 via, for example, a shutter that lowers when the cassette is inserted into a dispenser mechanism located within each of the cash compartments.

The cash delivery mechanism 28 can be in the form of a split dispenser, where notes from the second cash compartment 22, which in this embodiment is below the first cash compartment 20, are fed through a feeder mechanism to a common note path of the delivery mechanism shared for delivery of cash notes from either of the first and second cash compartments. The delivery mechanism may use a friction feed system to transport the notes from each of the cassettes in the cash compartments to the delivery point such as the dispenser 32.

The cash delivery mechanism 28 is provided with a number of optical sensors to track the position of a note as it travels from a cassette 30 to the dispenser 32. If for any reason the note becomes jammed, the position of the note is logged so that its position can be easily identified to a person trying to remove the jammed note. Access to the delivery mechanism 28 to remove a jammed note can be through one of the cash compartments, and may require the removal of one or more of the cassettes 30, and/or dispensing mechanism associated with the cassettes 30, from the cash compartment. Access to the entire cash delivery mechanism is also made possible through a single cash compartment by use of access flaps. Additionally, or alternatively, the delivery mechanism may be accessed through part of the ATM other than the cash compartments, for example via a maintenance opening (not indicated), which may be located at a side of the ATM different from the side on which the doors are located. At least part of the delivery mechanism may be removed via the maintenance opening.

It is envisaged that the first compartment 20, which is the upper compartment, will be used by the merchant. Assigning the first compartment 20 to the merchant means that if the second compartment 22, which is the lower compartment, is out of service, for example because a note has jammed in the delivery mechanism 28 associated with the second compartment, the ATM will still be operational by use of the upper cash compartment 20. Furthermore, providing the merchant with access to the cash delivery mechanism provides the advantage of maximum in-service time, removing the requirements seen in known service provider only ATM units, where it is necessary to call out a service engineer, on behalf of the service provider, to clear the jam before the ATM can be brought back in-to service.

Each of the cash compartments 20, 22 is provided with an independent note qualifier and rejection system (not shown), which are known. The note qualifier system may use sensitive mechanical or optical measuring devices to determine if a cash note is fit to dispense. Measurements can be made relating to note thickness and width to ensure that only a single note is dispensed, and if a set criteria is not met, the note can be sent to a reject area within the compartment that the note originated from. In addition, the ATM may be provided with a test function where cash notes are drawn from a cassette 30 and are sent to the reject area within the compartment that the cassette is located. This function can be used to confirm the functionality of the dispensing mechanism of the ATM. This arrangement ensures that any rejected notes stay within the confines of the originating cash compartment and thereby removes the possibility of an operator accessing cash from a cash compartment via diagnostic test dispense functions The ATM is also provided with a cash auditing system (not indicated) for each of the cash compartments. The auditing system will record such data of a quantity of cash notes loaded into and/or dispensed from each cassette within each of the cash compartments. Such loading and/or removal of cash is provided via either of the doors; cash is also delivered from the cash compartments using the cash delivery mechanism. The auditing system may be accessed locally or remotely by use of a secure password system. Access to the auditing system for each of the compartments may require independent passwords.

Figure 2:
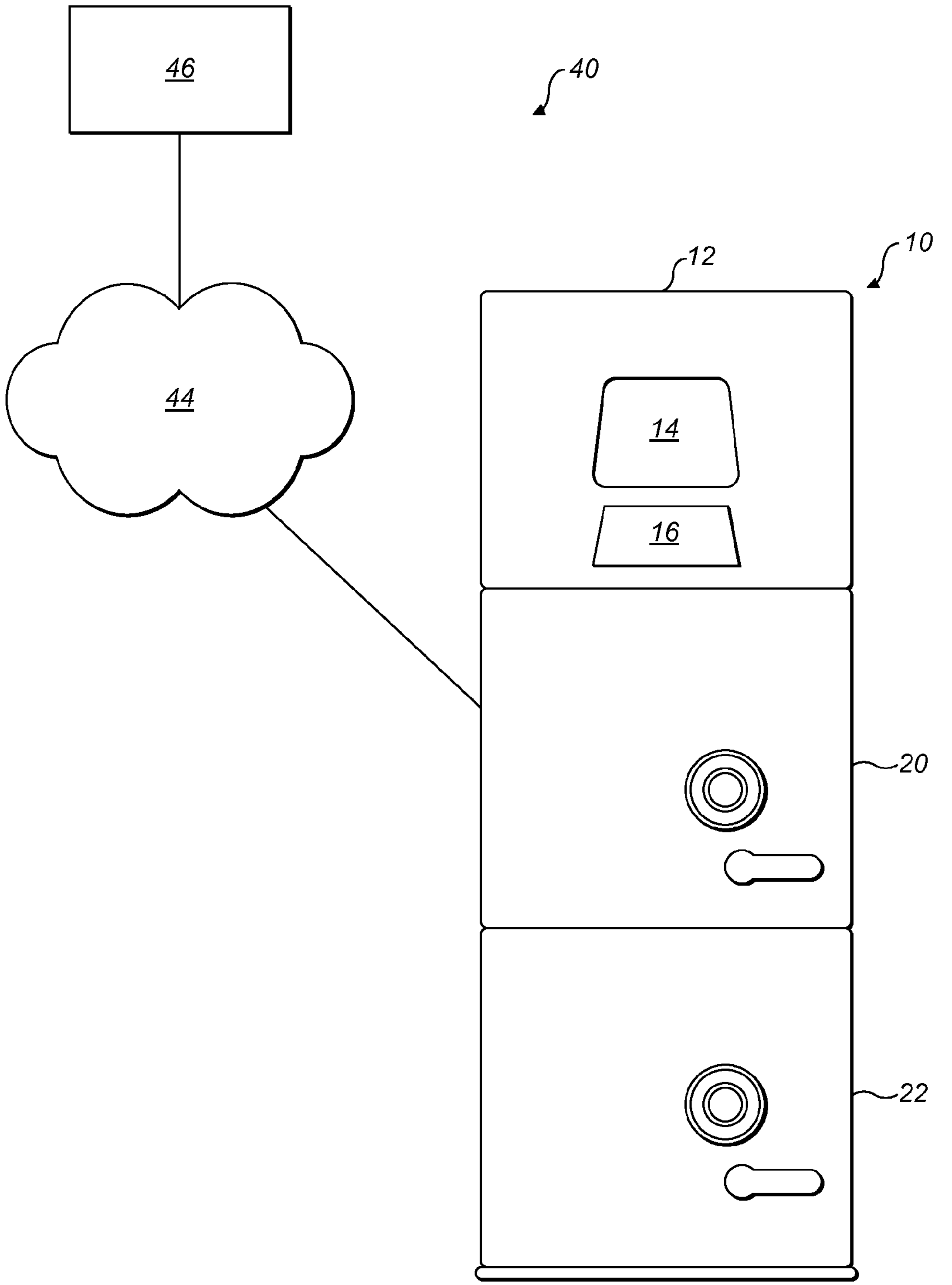
FIG. 2 shows a schematic diagram of the device of FIG. 1 connected to a banking network according to an embodiment of the present invention.

Referring now to FIG. 2, the ATM 10 is part of a system 40, for delivering cash. The ATM 10 is connected to a network 44 connecting the ATM 10 to an accounting system 46 of a service provider. The accounting system 46 will provide the ATM with authorisation to dispense cash of a specified quantity from the cash recipient's bank account. This is in response to a request by the ATM 10 to the account system for authorisation of the cash withdrawal requested by the potential cash recipient. The accounting system will receive information from the ATM 10 regarding the amount of money that has been withdrawn, and from which compartment the money has been withdrawn. This is important, as the accounting system will need to know if the money has come from the merchant's cash compartment or from the service provider's cash compartment. From this information, the accounting system will determine if the merchant should be credited by the service provider with the amount of cash that has been withdrawn and possibly any fee that may be associated with the withdrawal.

In use, a customer will request money from the ATM in a known manner. The ATM will check to see which compartment has enough money to complete the transaction requested, and will normally, as a first choice, withdraw money from the cash compartment under the control of the merchant However, if there are insufficient funds in the cash compartment under the control of the merchant, the cash will be taken from the other cash compartment, meaning the merchant's ATM is still able to dispense cash to a recipient. Examples of when a transaction may not be carried out from the preferred merchant's compartment may be when there is no money left in that compartment, or when there are insufficient funds to complete the entire transaction e.g. a request for £500 has been made, but there is only £200 in the preferred compartment. The ATM is therefore programmed to draw all the money from a single cash compartment.

The above embodiments are to be understood as illustrative examples of the invention. Further embodiments of the invention are envisaged. For example, the cash compartments may be arranged so that they are side by side and two independent cash delivery mechanisms may be used to transfer money from each of the cash compartments to the bill tray. Further, although two separate cash compartments are described herein, the ATM may include further cash compartments. Moreover, the auditing system may be configured to monitor and/or record data relating to any activity of the ATM multiple cash compartments, in addition to the types of such activity described above. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A cash dispensing apparatus for independent replenishment by two different parties, the cash dispensing apparatus comprising a first cash compartment associated with a first party, a second cash compartment associated with a second party and a cash delivery mechanism configured to deliver cash notes from the first and second compartments to a recipient, wherein each of the first and second cash compartments is independently lockable to prevent access thereinto by a party other than its respective associated party, and wherein the cash dispensing apparatus is configured to send data to an accounting system responsive to each cash withdrawal operation initiated by the recipient, said data relating to a respective cash withdrawal operation initiated by the recipient and including an indication of the compartment used to satisfy the respective withdrawal operation.

2. A cash dispensing apparatus as claimed in claim 1, wherein the apparatus is arranged to track progress of cash notes being delivered through the cash delivery mechanism from any one of the first and second cash compartments.

3. A cash dispensing apparatus as claimed in claim 1, wherein the cash delivery mechanism is accessible independently from either of said first and second cash compartments.

4. A cash dispensing apparatus as claimed in claim 1, wherein the cash delivery mechanism is accessible through at least one of said first and second cash compartments.

5. A cash dispensing apparatus as claimed in claim 4, wherein a part of the cash delivery mechanism is arranged to feed cash notes from the first cash compartment, and said part of the cash delivery system is accessible through the second cash compartment.

6. A cash dispensing apparatus as claimed in claim 1, wherein the cash delivery mechanism comprises a common path for feeding cash notes taken from either of the first and second cash compartments.

7. A cash dispensing apparatus as claimed in claim 1, wherein at least one of the first and second cash compartments has a cash note qualifier and rejection system.

8. A cash dispensing apparatus as claimed in claim 1, comprising a system for monitoring activity of said first and second cash compartments.

9. A cash dispensing apparatus as claimed in claim 8, wherein the system is arranged to record data indicative of a use of either of said first and second cash compartments.

10. A cash dispensing apparatus as claimed in claim 8, the apparatus comprising at least one sensor for tracking cash notes delivered from either of said first and second cash compartments, wherein the system is arranged to record data indicative of a quantity of cash notes delivered from either of said first and second cash compartments to a recipient.

11. A cash dispensing apparatus as claimed in claim 8, wherein the system is arranged to record data indicative of a quantity of cash notes transferred into or out of either of said first and second cash compartments.

12. A cash dispensing apparatus as claimed in claim 1, wherein the cash delivery mechanism is arranged to deliver cash notes from the first cash compartment in preference to delivering cash notes from the second cash compartment.

13. A cash dispensing apparatus as claimed in claim 12, wherein the cash delivery mechanism delivers cash notes from said second cash compartment when there is insufficient cash in the first cash compartment.

14. A system for delivering cash to a recipient, the system comprising:

a cash dispensing apparatus for independent replenishment by two different parties, the cash dispensing apparatus comprising a first cash compartment associated with a first party, a second cash compartment associated with a second party and a cash delivery mechanism configured to deliver cash notes from the first and second compartments to a recipient, wherein each of the first and second compartments is independently lockable to prevent access thereinto by a party other than its respective associated party, and wherein the cash dispensing apparatus is configured to send data to an accounting system responsive to each cash withdrawal operation initiated by the recipient and including an indication of the compartment used to satisfy the respective withdrawal operation;

an account system; and a network connecting the cash dispensing apparatus to the account system.

15. A system as claimed in claim 14, wherein the accounting system is arranged to process data indicative of crediting a keeper of the cash dispensing apparatus with the amount of said cash withdrawal when the withdrawn cash has been delivered from a selected one of said first and second cash compartments.

* * * * *